US012675220B2

(12) United States Patent (10) Patent No.: US 12,675,220 B2
Shao (45) Date of Patent: Jul. 7, 2026

(54) SYSTEMS AND METHODS FOR STORAGE CONFIGURATION BASED ON INDUSTRIAL INTERNET OF THINGS DATA CENTER

(71) Applicant: CHENGDU QINCHUAN IOT TECHNOLOGY CO., LTD., Chengdu (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/235,549

(22) Filed: Jun. 11, 2025

(65) Prior Publication Data

US 2025/0306765 A1    Oct. 2, 2025

(30) Foreign Application Priority Data

May 14, 2025    (CN) .......................... 202510616680.8

(51) Int. Cl.
*G06F 3/06* (2006.01)
*G16Y 40/20* (2020.01)

(52) U.S. Cl.
CPC .......... *G06F 3/0611* (2013.01); *G06F 3/0631* (2013.01); *G06F 3/067* (2013.01); *G16Y 40/20* (2020.01)

(58) Field of Classification Search
None
See application file for complete search history.

(56) References Cited

U.S. PATENT DOCUMENTS

| | | | |
|---|---|---|---|
| 11,662,703 B1* | 5/2023 | Shao | ...................... H04L 67/12 700/79 |
| 12,498,865 B1* | 12/2025 | Shao | ..................... G06F 3/0629 |
| 2023/0206356 A1* | 6/2023 | Shao | ................ G06Q 10/06315 705/7.25 |

FOREIGN PATENT DOCUMENTS

| | | |
|---|---|---|
| CN | 110073301 A | 7/2019 |
| CN | 116248275 A | 6/2023 |

(Continued)

OTHER PUBLICATIONS

The Second Office Action in Chinese Application No. 202510616680.8 mailed on Aug. 7, 2025, 19 pages.

(Continued)

*Primary Examiner* — Eddy Cheung
(74) *Attorney, Agent, or Firm* — PORUS IP LLC

(57) ABSTRACT

The present disclosure relates to a system and method for storage configuration based on an industrial internet of things (IoT) data center. The method includes: determining a data upload parameter based on data attribute information, historical retrieval records, and historical processing records of data to be processed; generating database configuration parameters based on the data upload parameter and a data acquisition frequency; generating, based on the data upload parameter, a data upload instruction, and transmitting the data upload instruction to the industrial IoT sensing network platform; generating operating parameters of a second storage component based on cache database configuration parameters; controlling a second storage controller to allocate storage space to a cache database based on the operating parameters of the second storage component; and generating, based on sub-database configuration parameters, a sub-database configuration instruction, and issuing the sub-database configuration instruction to the industrial IoT sensing network platform.

16 Claims, 4 Drawing Sheets

(56)          References Cited

FOREIGN PATENT DOCUMENTS

| | | |
|---|---|---|
| CN | 116795868 A | 9/2023 |
| CN | 116886724 A | 10/2023 |
| CN | 119109708 A | 12/2024 |
| CN | 119887125 A | 4/2025 |
| CN | 119892884 A | 4/2025 |

OTHER PUBLICATIONS

Decision to Grant a Patent in Chinese Application No. 202510616680.8 mailed on Aug. 20, 2025, 5 pages.
Xu, Lin et al., Research on Massive Data Collection Methods for Energy Industry Internet, Intelligent Control Technology, 2024, 4 pages.
Miguel Oliverira et al., Industry Focused in Data Collection: How industry 4.0 is handled by big data, DSIT'19, Jul. 2019, Seoul, Republic of Korea, 2019, 7 pages.
First Office Action in Chinese Application No. 202510616680.8 mailed on Jul. 8, 2025, 20 pages.

\* cited by examiner

100

200

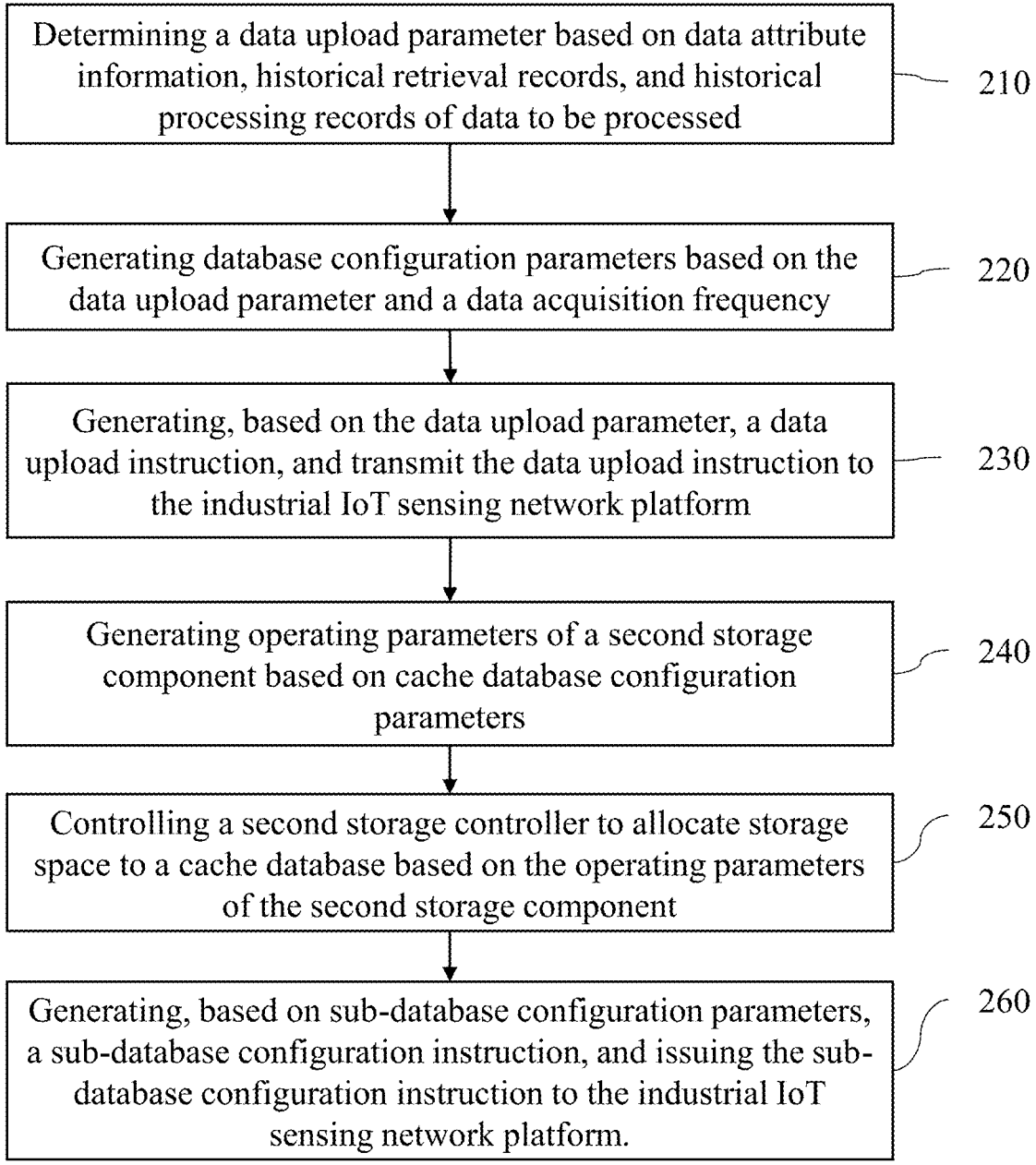

Determining a data upload parameter based on data attribute information, historical retrieval records, and historical processing records of data to be processed — 210

Generating database configuration parameters based on the data upload parameter and a data acquisition frequency — 220

Generating, based on the data upload parameter, a data upload instruction, and transmit the data upload instruction to the industrial IoT sensing network platform — 230

Generating operating parameters of a second storage component based on cache database configuration parameters — 240

Controlling a second storage controller to allocate storage space to a cache database based on the operating parameters of the second storage component — 250

Generating, based on sub-database configuration parameters, a sub-database configuration instruction, and issuing the sub-database configuration instruction to the industrial IoT sensing network platform. — 260

SYSTEMS AND METHODS FOR STORAGE CONFIGURATION BASED ON INDUSTRIAL INTERNET OF THINGS DATA CENTER

CROSS-REFERENCE TO RELATED APPLICATIONS

This application claims priority to Chinese Application No. 202510616680.8 filed on May 14, 2025, the entire contents of which are incorporated herein by reference.

TECHNICAL FIELD

The present disclosure generally relates to the field of data storage and management, and in particular, to a system and a method for storage configuration based on an industrial internet of things data center.

BACKGROUND

With the advent of the Industrial 4.0 era, the industrial internet of things (IoT) has become the core driving force for the intelligent transformation of the manufacturing industry. In the production line based on the industrial IoT, numerous sensors, intelligent devices, and control systems are interconnected to build a highly collaborative and data-driven production environment. In such an environment, storing and managing a large amount of data is critical to ensuring that the production line operates efficiently. However, the data volume generated by enterprises is growing exponentially with the increase in the count of industrial devices connected to the internet. Different types of data storage strategies need to be established for different production links, which puts higher requirements on the data storage system.

Therefore, it is necessary to develop a system and a method for storage configuration based on an industrial IoT data center to store and manage data more intelligently and efficiently.

SUMMARY

One or more embodiments of the present disclosure provide a method for storage configuration based on an industrial internet of things (IoT) data center, which is performed by an industrial IoT management platform of a system for storage configuration based on an industrial IoT data center. The method for storage configuration based on the industrial IoT data center comprises: determining a data upload parameter based on data attribute information, historical retrieval records, and historical processing records of data to be processed, the data upload parameter indicating a storage strategy of the data to be processed for the industrial IoT sensing network platform on the; generating database configuration parameters based on the data upload parameter and a data acquisition frequency; generating, based on the data upload parameter, a data upload instruction, and transmitting the data upload instruction to the industrial IoT sensing network platform; generating operating parameters of a second storage component based on cache database configuration parameters; controlling a second storage controller to allocate storage space to a cache database based on the operating parameters of the second storage component; and generating, based on sub-database configuration parameters, a sub-database configuration instruction, and issuing the sub-database configuration instruction to the industrial IoT sensing network platform. The industrial IoT sensing network platform stores the data to be processed into a corresponding sub-database, uploads the data to be processed to a cache database, or uploads the data to be processed to a processing unit, based on the data upload instruction, generates, based on the sub-database configuration instruction, the operating parameters of the first storage component, controls the first storage controller to allocate the storage space to the sub-database based on the operating parameters of the first storage component. The industrial IoT perception control platform obtains the data to be processed and uploads the data to be processed to the industrial IoT sensing network platform. The first storage component and the second storage component correspond to different memories.

One or more embodiments of the present disclosure provide a system for storage configuration based on an industrial IoT data center, comprising: an industrial IoT management platform, an industrial IoT sensing network platform, and an industrial IoT perception control platform, wherein the industrial IoT management platform is communicatively connected to the industrial IoT perception control platform via the industrial IoT sensing network platform; and the industrial IoT management platform is configured to perform the above-described method for storage configuration based on the industrial IoT data center.

BRIEF DESCRIPTION OF THE DRAWINGS

This present disclosure will be further illustrated by way of exemplary embodiments, which will be described in detail by means of the accompanying drawings. These embodiments are not limiting, and in these embodiments, the same numbering indicates the same structure, wherein:

FIG. 2 is a flowchart illustrating an exemplary process of storage configuration based on an industrial IoT data center according to some embodiments of the present disclosure;

DETAILED DESCRIPTION

Figure 1:
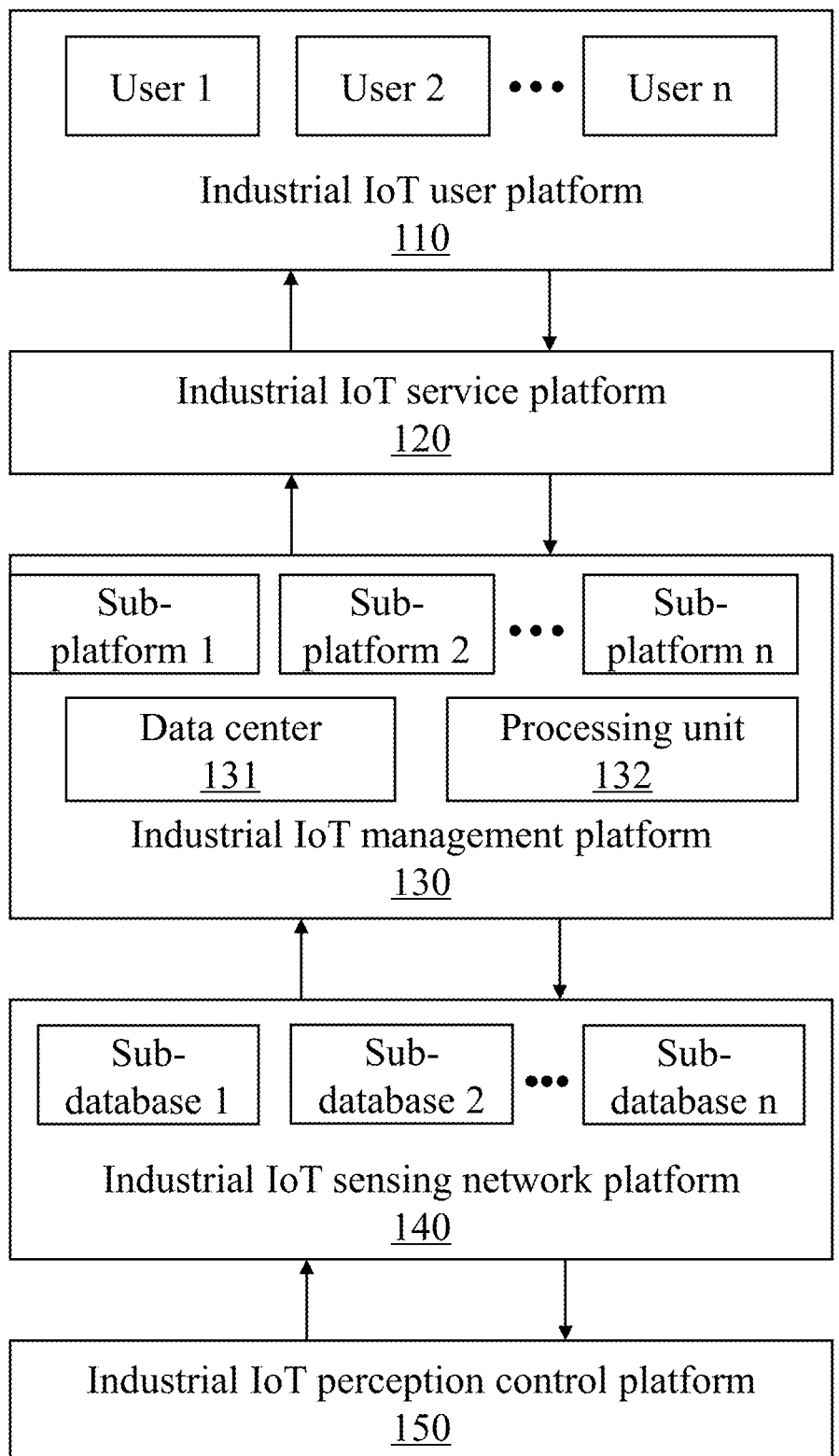
FIG. 1 is an exemplary schematic diagram illustrating a system for storage configuration based on an industrial IoT data center according to some embodiments of the present disclosure.

To more clearly illustrate the technical solutions of the embodiments of the present disclosure, the drawings required for use in the description of the embodiments will be briefly introduced below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "equipment," "unit," and/or "module" used herein are a way to distinguish between different components, elements, parts, sections, or assemblies at different levels. However, the terms may be replaced by other expressions if other words accomplish the same purpose. However, the terms may be replaced by other expressions if other words accomplish the same purpose.

As shown in this disclosure and claims, unless the context clearly indicates an exception, the words "a", "one", "an" and/or "the" are not intended to refer to the singular but may include the plural. Generally speaking, the terms "include" and "comprises" only indicate the inclusion of explicitly identified steps and elements, and these steps and elements do not constitute an exclusive list, and the method or device may also include other steps or elements.

Flowcharts are used in the present disclosure to illustrate the operations performed by a system according to embodiments of the present disclosure. It should be appreciated that the preceding or following operations are not necessarily performed in an exact sequence. Instead, operations can be processed in reverse order or simultaneously. Also, it is possible to add other operations to these processes or to remove an operation or operations from these processes.

FIG. 1 is an exemplary schematic diagram illustrating a system for storage configuration based on an industrial IoT data center according to some embodiments of the present disclosure.

In some embodiments, as shown in FIG. 1, the system for storage configuration 100 based on the industrial IoT data center may include an industrial IoT user platform 110, an industrial IoT service platform 120, an industrial IoT management platform 130, an industrial IoT sensing network platform 140, and an industrial IoT perception control platform 150.

The industrial IoT user platform 110 refers to a platform for interacting with a user. In some embodiments, the industrial IoT user platform 110 may include a plurality of users, including a user 1, a user 2, . . . , and a user n. For example, an industrial enterprise may correspond to one or more users. In some embodiments, the industrial IoT user platform 110 is configured to receive instruction information from the user and issue the instruction information to the industrial IoT service platform 120.

In some embodiments, the industrial IoT user platform 110 may be a platform based on a desktop computer, a tablet computer, a laptop computer, a cellular phone, or other electronic devices capable of data processing and data communication.

The industrial IoT service platform 120 refers to a platform for obtaining service data of the industrial IoT. In some embodiments, the industrial IoT service platform 120 may interact bi-directionally with the industrial IoT management platform 130. For example, after the industrial IoT service platform 120 issues the instruction information of the user to the industrial IoT management platform 130, the industrial IoT management platform 130 uploads execution data corresponding to the instruction information to the industrial IoT service platform 120.

The industrial IoT management platform 130 refers to a platform for controlling the system for storage configuration 100 based on the industrial IoT data center. In some embodiments, the industrial IoT management platform 130 may include a data center 131, a processing unit 132, and a second storage controller. The data center 131 includes a cache database, and the cache database is in communication connection with a sub-database of the industrial IoT sensing network platform 140. The processing unit 132 refers to a central processor for processing data to be processed. The second storage controller refers to a device that controls (including the control of an address signal, a data signal, and various command signals) memory access according to a specific timing rule, so that a main device (the device accessing the memory) may use the storage resources in the memory according to requirements of the main device.

In some embodiments, the industrial IoT management platform 130 may read the data to be processed from the data center 131. The data to be processed may include production operating data, factory monitoring data, product inspection data, or the like. In some embodiments, the processing unit 132 may be configured to process a start time point, an end time point, etc., of the data to be processed and the cached data, and process the usage records (including retrieval records of results of processed data by the user and other operations/procedures, and the retrieval records including a count of the retrievals, an initiating object of each retrieval, a time point of the retrieval, etc.).

In some embodiments, the industrial IoT management platform 130 may include a plurality of sub-platforms, including sub-platform 1, sub-platform 2, . . . , and sub-platform n. For example, the sub-platforms may include a device management platform, a quality control platform, a safety monitoring platform, etc. In some embodiments, the industrial IoT management platform 130 may be implemented based on a processor, a server, etc.

In some embodiments, the industrial IoT management platform 130 may interact with the industrial IoT sensing network platform 140.

In some embodiments, the industrial IoT management platform 130 is configured to determine a data upload parameter based on data attribute information, historical retrieval records, and historical processing records of the data to be processed, the data upload parameter indicating a storage strategy of the data to be processed for the industrial IoT sensing network platform 140.

In some embodiments, the industrial IoT management platform 130 is configured to generate database configuration parameters based on the data upload parameter and a data acquisition frequency, and generate, based on the data upload parameter, a data upload instruction, and transmit the data upload instruction to the industrial IoT sensing network platform 140. The database configuration parameters include cache database configuration parameters and sub-database configuration parameters.

In some embodiments, the industrial IoT management platform 130 is further configured to generate operating parameters of a second storage component based on the cache database configuration parameters, control the second storage controller to allocate storage space to the cache database based on the operating parameters of the second storage component, generate, based on sub-database configuration parameters, a sub-database configuration instruction, and issue the sub-database configuration instruction to the industrial IoT sensing network platform 140.

In some embodiments, the industrial IoT sensing network platform 140 is a platform for data transmission in the system for storage configuration 100 based on the industrial IoT data center. In some embodiments, the industrial IoT sensing network platform 140 may include a first storage controller and a sub-database for storing the data to be processed. The first storage controller refers to a device that controls (including the control of the address signal, the data signal, and the various command signals) the memory access according to a specific timing rule, so that the main device (the device accessing the memory) may use the storage resources in the memory according to the requirements of the main device.

In some embodiments, the sub-database may include a plurality of sub-databases, including sub-database 1, sub-database 2, . . . , sub-database n for storing different types of data to be processed. For example, the sub-databases may include a device maintenance database, a quality monitoring database, a security management database, or the like. In some embodiments, the industrial IoT sensing network platform 140 may be configured with a communication device, the server, etc.

In some embodiments, the cache database of the data center 131 (located in a main memory, i.e., a first storage component) is in a communication connection (e.g., transmitting the data to be processed uploaded by the client terminal (the industrial IoT perception control platform 150) with the plurality of sub-databases of the industrial IoT sensing network platform 140 (located in different secondary memories, i.e., the second storage component) via wireless links. Different wireless links have different bandwidths. The cache database and the sub-database include free disk space of varying sizes. The free disk space may be mapped to different virtual storages (which may be used to store different types of data to be processed). The different virtual storages have different physical addresses for establishing communication links.

In some embodiments, the industrial IoT sensing network platform 140 is configured to store the data to be processed into a corresponding sub-database, upload the data to be processed to the cache database, or upload the data to be processed to the processing unit, based on the data upload instruction.

In some embodiments, the industrial IoT sensing network platform 140 is further configured to generate, based on the sub-database configuration instructions, the operating parameters of the first storage component, and control the first storage controller to allocate storage space to the sub-database. The first storage component and the second storage component correspond to different memories.

In some embodiments, the industrial IoT sensing network platform 140 may interact with the industrial IoT perception control platform 150.

The industrial IoT perception control platform 150 is a platform for monitoring and controlling a production process. The industrial IoT perception control platform 150 includes a data acquisition device. In some embodiments, the data acquisition device may include at least one of a production device and an auxiliary device deployed on a production line. The production device refers to a device required for the production process itself; and the auxiliary device refers to an auxiliary device outside the production process (e.g., a monitoring device, a quality control device, or the like).

In some embodiments, the industrial IoT perception control platform 150 is configured to obtain the data to be processed and upload the data to be processed to the industrial IoT sensing network platform 140. For example, the industrial IoT perception control platform 150 is configured to obtain enterprise operating data, such as the production operating data, the factory monitoring data, and the product inspection data, and upload them to the industrial IoT sensing network platform 140.

FIG. 2 is a flowchart illustrating an exemplary process of a storage configuration based on an industrial IoT data center according to some embodiments of the present disclosure. In some embodiments, process 200 is performed by the industrial IoT management platform 130 based on the system for storage configuration 100 of the industrial IoT data center. As shown in FIG. 2, the process 200 includes following operations.

In 210, determining a data upload parameter based on data attribute information, historical retrieval records, and historical processing records of the data to be processed.

The data to be processed may include data obtained by the industrial IoT perception control platform 150. For example, the data to be processed may include one or more of production operating data, factory monitoring data, product inspection data, or the like.

The data attribute information refers to attribute information related to the data to be processed. For example, the data attribute information may include a data type, a data volume, and an acquisition time, etc., of the data to be processed. The data type may include a production procedure to which the data to be processed belongs.

In some embodiments, the data attribute information may be determined based on a type of data acquisition device and an acquisition time corresponding to the industrial IoT perception control platform 150 that uploads the data to be processed, and the size of the storage space occupied by the data to be processed.

The historical retrieval records refer to historical records of retrieval of the data to be processed by the processing unit, the cache database, or the like. In some embodiments, the historical retrieval records may also include data attribute information of retrieved data to be processed, and information such as a retrieval manner, a retrieval time, etc., of the retrieved data to be processed.

In some embodiments, the industrial IoT management platform 130 may obtain the historical retrieval records from data reading logs of each sub-database of the industrial IoT sensing network platform 140.

The historical processing records refer to records of processing of the data to be processed by the data center of the industrial IoT management platform 130, etc. In some embodiments, the historical processing records may include a start time point, an end time point, etc., of processing the data to be processed and the cached data in the cache database, the usage records of the processing results, etc. The usage records of the processing results include a count of times the processing results are retrieved by the user or other computer programs and instructions, an object initiating each retrieval, a time point of the retrieval, etc.

In some embodiments, the industrial IoT management platform 130 may obtain the historical processing records from the data center.

In some embodiments, the data upload parameter indicates the storage strategy of the data to be processed for the industrial IoT sensing network platform 140. The storage strategy may include storing the data to be processed in a corresponding sub-database, uploading the data to be processed to the cache database in the data center of the industrial IoT management platform 130, uploading the data to be processed to the processing unit of the industrial IoT management platform 130, etc.

In some embodiments, the industrial IoT sensing network platform 140 may store or upload the data to be processed to the corresponding database or a storage unit based on the data upload parameter.

In some embodiments, the industrial IoT management platform 130 may filter out, based on the data attribute information of the data to be processed, historical retrieval records and historical processing records of historical data to be processed in a data type that is the same or similar to the type of the data to be processed, and determine a length of waiting processing time and a retrieved index based on the historical retrieval records and the historical processing records. The industrial IoT management platform 130 may determine a timeliness requirement degree of the data to be processed based on the length of waiting processing time and the retrieved index, and determine the data upload parameter based on the timeliness requirement degree.

The length of waiting processing time is a length of time, from the time that the historical data to be processed is uploaded to the sub-database of the industrial IoT sensing network platform 140 to the time that the industrial IoT management platform 130 begins to process the historical data to be processed.

The retrieved index is used to characterize a frequency at which the data to be processed is retrieved. The retrieved index is positively correlated with a retrieval frequency in the historical retrieval records and negatively correlated with an initial retrieval time interval. The initial retrieval time interval refers to a length of time between the historical data to be processed being stored in the industrial IoT sensing network platform 140 and being retrieved for the first time.

The timeliness requirement degree characterizes a timeliness of the data to be processed. In some embodiments, the timeliness requirement degree may be determined by the following equation:

$$\text{timeliness requirement degree} = \tag{1}$$
$$k_1 \times \text{length of waiting processing time} + k_2 \times \text{retrieved index}$$

wherein $k_1$ denotes a coefficient less than 0, and $k_2$ denotes a coefficient greater than 0. It is understood that the shorter the length of waiting processing time is, the greater the retrieved index is, and the higher the timeliness requirement degree is.

In some embodiments, when the timeliness requirement degree is greater than or equal to a first threshold, the data upload parameter is to upload the data to be processed to the processing unit of the industrial IoT management platform 130. When the timeliness requirement degree is less than the first threshold and greater than or equal to a second threshold, the data upload parameter is to upload the data to be processed to the cache database in the data center of the industrial IoT management platform 130. When the timeliness requirement degree is less than the second threshold, the data upload parameter is to store the data to be processed to the corresponding sub-database of the data to be processed. The first threshold and the second threshold are obtained by the technician based on prior experience, and the first threshold is greater than the second threshold.

In 220, generating database configuration parameters based on the data upload parameter and a data acquisition frequency.

The data acquisition frequency is a frequency at which the data acquisition device acquires the data to be processed.

In some embodiments, the industrial IoT management platform 130 may obtain a current data acquisition frequency from the industrial IoT perception control platform 150.

The database configuration parameters refer to parameters that configure the size of the storage space for the database. In some embodiments, the database configuration parameters include cache database configuration parameters and sub-database configuration parameters. The cache database configuration parameters are used to configure the size of the storage space of the cache database of the data center of the industrial IoT management platform 130, and the sub-database configuration parameters are used to configure the size of the storage space of at least one sub-database of the industrial IoT sensing network platform 140.

In some embodiments, the industrial IoT management platform 130 may determine a database (e.g., a cache database, a sub-database, etc.) for storing the data to be processed based on the data upload parameter. The industrial IoT management platform 130 may determine a data volume to be stored during a future time period based on the data acquisition frequency. The industrial IoT management platform 130 may determine future remaining space of the database storing the data to be processed based on the data volume to be stored during the future time period and the current remaining space of the database storing the data to be processed. In response to determining that the future remaining space is less than a preset space threshold (such as 10% of the database), the industrial IoT management platform 130 may reallocate the size of the storage space of the database, so that the future remaining space of the database exceeds the preset space threshold.

In some embodiments, during each preset period, the industrial IoT management platform 130 may update, based on the database configuration parameters of a previous period, a data acquisition frequency for a current period to obtain an updated frequency; and control the data acquisition device via the industrial IoT perception control platform 150 to perform data acquisition according to the updated frequency.

The preset period refers to a period for updating the database configuration parameters. In some embodiments, the preset period is negatively correlated to an acquisition frequency of the data to be processed.

The updated frequency refers to a data acquisition frequency after being updated.

In some embodiments, the industrial IoT management platform 130 may query an acquisition frequency table based on the database configuration parameters of the previous period to obtain the updated frequency.

In some embodiments, the acquisition frequency table is preset by the technician. In the acquisition frequency table, the closer the size of the storage space occupied by the cache database and the sub-database in the database configuration parameters is to the size of the total space of the storage device, the lower the data acquisition frequency is. It is understood that the closer the size of the storage space occupied by the cache database and the sub-database is to the size of the total space of the storage device, the greater the storage pressure is, and the more likely there is insufficient storage space. Therefore, the storage pressure on the storage device can be relieved by reducing the data acquisition frequency.

In some embodiments, the problem of data loss due to insufficient storage space can be effectively avoided by determining the update parameters to adjust the data acquisition frequency of data acquisition parameters according to the database configuration parameters of the previous period.

In 230, generating, based on the data upload parameter, a data upload instruction, and transmitting the data upload instruction to the industrial IoT sensing network platform.

In some embodiments, the industrial IoT management platform 130 may designate the data upload parameter as the data upload instruction and transmit the data upload parameter to the industrial IoT sensing network platform 140.

In some embodiments, the industrial IoT sensing network platform 140 may store the data to be processed in the corresponding sub-database, or upload the data to be processed to the cache database, or upload the data to be processed to the processing unit based on the data upload instruction.

In 240, generating the operating parameters of a second storage component based on the cache database configuration parameters.

The second storage component refers to a component of the industrial IoT management platform 130 that implements a data storage function, such as memory. In some embodiments, the first storage component and the second storage component correspond to different memories. The first storage component corresponds to the sub-database of the industrial IoT sensing network platform 140, and the second storage component corresponds to the cache database of the industrial IoT management platform 130, and different sub-databases are located in different first storage components. The different sub-databases and the cache database are respectively configured as free disk space in the different first storage components and the second storage component, and the different sub-databases and the cache database are used to store different types of data to be processed.

In some embodiments, the cache database of the industrial IoT management platform 130 is in communication connection with one or more sub-databases of the industrial IoT sensing network platform 140 by way of wired and/or wireless. The communication connection links between the cache database and the different sub-databases have different data transmission bandwidths.

The operating parameters of the second storage component refer to parameters that allocate the size of the storage space of a cache database. In some embodiments, the industrial IoT management platform 130 may designate the size of the storage space of the cache database in the cache database configuration parameters as the operating parameters of the second storage component.

In 250, controlling the second storage controller to allocate the storage space to the cache database based on the operating parameters of the second storage component.

In some embodiments, the second storage component may determine a space difference based on the size of the storage space of the cache database in the operating parameters, and the size of the current storage space of the cache database. The second storage component may divide unused storage space from the second storage component based on the space difference and merge the divided unused storage space into the cache database to allocate the storage space to the cache database.

In 260, generating, based on the sub-database configuration parameters, a sub-database configuration instruction, and issuing the sub-database configuration instruction to the industrial IoT sensing network platform.

In some embodiments, the industrial IoT management platform 130 may designate the sub-database configuration parameters as the sub-database configuration instruction.

In some embodiments, the industrial IoT sensing network platform 140 may generate, based on the sub-database configuration instructions, the operating parameters for the first storage component, and control the first storage controller to allocate the storage space to the sub-database based on the operating parameters of the first storage component.

The operating parameters of the first storage component refer to operating parameters that allocate the size of the storage space of the sub-database. In some embodiments, the industrial IoT management platform 130 may designate the size of the storage space of the at least one sub-database included in the sub-database configuration instruction as the operating parameters of the first storage component.

The specific manner for controlling the first storage controller to allocate the storage space to the sub-database is similar to the manner for controlling the second memory to allocate the storage space to the cache database, which may be found in the above-mentioned descriptions.

In some embodiments, the data upload parameter is determined based on the data attribute information, the historical retrieval records, and the historical processing records of the data to be processed, and data configuration parameters are determined based on the data upload parameter, so that the size of the storage space of the sub-databases of the industrial IoT sensing network platform 140 and the cache database of the industrial IoT management platform 130 may be dynamically configured according to the data upload situation, thus avoiding data loss caused by the fullness of a portion of databases and the waste of resources caused by the idleness of the portion of databases, and effectively improving the utilization efficiency of the storage space and alleviate storage pressure.

In some embodiments, the industrial IoT management platform 130 may also obtain, from the first storage controller, a total storage space allocated or released by the sub-database to a task process within a preset time period, and designate the sub-database of which the total storage space allocated or released exceeds a preset threshold as the target sub-database. The industrial IoT management platform 130 may modify configuration files and structured query language (SQL) of the target sub-database to adjust a maximum count of connections allowed by the target sub-database.

The preset time period refers to a past time period. In some embodiments, the preset time period may be preset by the technician, for example, the preset period may be a past hour, a past day, etc.

The task process refers to a task or an instruction performed by the industrial IoT. For example, the task process may include tasks such as querying data, analyzing data, etc. The storage space allocated to the task process refers to storage space allocated to all task processes for executing instructions. The storage space released to the task process refers to storage space released after the task process ends.

The preset threshold may be preset by the technician.

The target sub-database refers to a sub-database that needs to adjust the configuration files and the SQL.

The configuration files refer to computer files that set the maximum count of connections to the sub-database from the hardware. For example, the MySQL database configuration file may be my.ini or my.cnf file.

The SQL refers to a programming language that determines the maximum count of connections in the database configuration file. For example, the SQL may be a max_connections programming language under a mysqld topic, etc.

In some embodiments, when the total storage space allocated or released exceeds the preset threshold, the industrial IoT management platform 130 may modify the programming language that determines the maximum count of connections in the configuration file to increase the maximum count of connections allowed by the target sub-database. For example, the industrial IoT management platform 130 may modify programming code in the programming language that determines the maximum count of connections to modify the maximum count of connections allowed by the target sub-database.

It is understood that when the total storage space allocated or released exceeds the preset threshold, it means that the sub-database is read and written more frequently, and the maximum count of connections of the sub-database can be increased to improve a concurrency degree of the access.

In some embodiments, the maximum count of connections allowed by the sub-database is adjusted based on the total storage space allocated or released by the sub-database to the task process, thereby avoiding congestion and queuing when accessing the sub-database and improving the access efficiency of the sub-database.

It should be noted that the above description of the process 200 is provided for illustrative purposes only and is not intended to limit the scope of the present disclosure. For those of ordinary skill in the art, various changes and modifications can be made to the process 200 under the guidance of the present disclosure. However, these changes and modifications do not deviate from the scope of the present disclosure.

Figure 3:
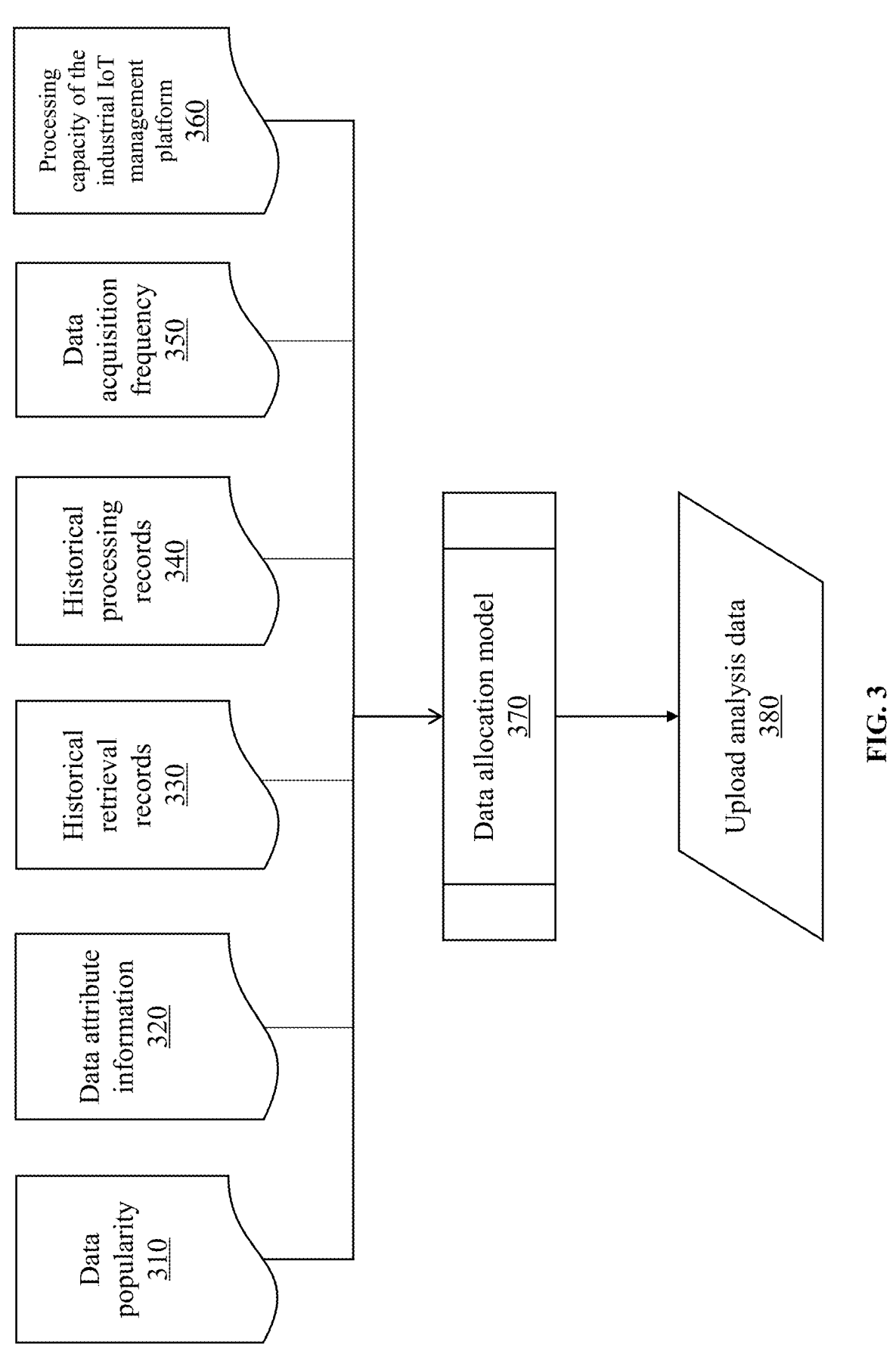
FIG. 3 is an exemplary schematic diagram illustrating a data allocation model according to some embodiments of the present disclosure.

FIG. 3 is an exemplary schematic diagram illustrating a data allocation model according to some embodiments of the present disclosure.

In some embodiments, the industrial IoT management platform 130 may determine upload analysis data via a data allocation model, based on data popularity, data attribute information of data to be processed, historical retrieval records of the data to be processed, historical processing records of the data to be processed, processing capacity of the industrial IoT management platform, and a data acquisition frequency. The data allocation model is a neural network model. The industrial IoT management platform 130 may determine the data upload parameter based on the upload analysis data.

The data popularity refers to a value that characterizes the frequency at which the data to be processed may be retrieved in the future. In some embodiments, the industrial IoT management platform 130 may designate an average value of the frequency of historical data to be processed being retrieved as the data popularity of the data to be processed. The historical data to be processed is in a data type that is the same as the type of the data to be processed.

The processing capacity refers to data that characterizes the processing performance of the processing device (e.g., the processor, the server, etc.) of the industrial IoT management platform 130. For example, the processing performance of the processing device includes a calculation frequency of the processing device, etc. In some embodiments, the industrial IoT management platform 130 may determine the processing capacity based on performance parameters of the processing device. The performance parameters are provided by the manufacturer of the processing device.

The upload analysis data refers to data that analyzes a recommendation degree for uploading the data to be processed to different modules. In some embodiments, the modules may include the sub-database of the industrial IoT sensing network platform 140, the cache database of the industrial IoT management platform 130, and the processing unit of the industrial IoT management platform 130. The upload analysis data is represented as a vector (x,y,z), x, y, and z may be values in a range of 0-1, which are used to represent the recommendation degree for uploading the data to be processed to the sub-database of the industrial IoT sensing network platform 140, the cache database of the industrial IoT management platform 130, and the processing unit of the industrial IoT management platform 130, respectively, and the greater the values of x, y, and z are, the higher the recommendation degree is.

The data allocation model refers to a model that is configured to predict the upload analysis data. In some embodiments, the data allocation model may be the neural network (NN) model.

As shown in FIG. 3, in some embodiments, an input of a data allocation model 370 includes data popularity 310 of the data to be processed, data attribute information 320, historical retrieval records 330, historical processing records 340, a data acquisition frequency 350 of an acquisition device for acquiring the data to be processed, and processing capacity 360 of the industrial IoT management platform 130, and an output of the data allocation model 370 includes upload analysis data 380. More descriptions regarding the data attribute information of the data to be processed, the historical retrieval records, the historical processing records, and the data acquisition frequency may be found elsewhere in the present disclosure (e.g., FIG. 1 and related descriptions thereof).

In some embodiments, the data allocation model may be obtained by training based on a large number of first training samples with first labels. The first training samples include sample data popularity of sample data to be processed, sample data attribute information, sample historical retrieval records, sample historical processing records, processing capacity of a sample industrial IoT management platform 130, and a sample data acquisition frequency.

In some embodiments, the industrial IoT management platform 130 may designate the data popularity, the data attribute information, the historical retrieval records, and the historical processing records of the sample data to be processed in the historical data, the processing capacity of the sample industrial IoT management platform 130, and the sample data acquisition frequency of the acquisition device for acquiring the sample data to be processed as the first training samples. The first label may be constructed based on the historical data upload parameter of the sample data to be processed. For example, if the sample data to be processed is uploaded to the cache database of the industrial IoT management platform 130 in a second historical time period, the first label is (0,1,0).

In some embodiments, the industrial IT management platform 130 may also construct the first label based on a timeliness requirement degree of the sample data to be processed. For example, for the sample data to be processed of which the timeliness requirement degree is greater than a first threshold, the first label may be (0,0,1), which is used to indicate that the data to be processed is uploaded to the processing unit of the industrial IoT management platform 130. For the sample data to be processed of which the timeliness demand degree is between the first threshold and a second threshold, the first label may be (0,1,0), which is used to indicate that the data to be processed is uploaded to the cache database of the industrial IoT management platform 130. For the sample data to be processed of which the timeliness demand degree is less than the second threshold, the first label may be (1,0,0), which indicates that the data to be processed is uploaded to the sub-database of the industrial IoT sensing network platform 140. More descriptions regarding the timeliness requirement degree, the first threshold, and the second threshold may be found elsewhere in the present disclosure (e.g., FIG. 2 and related descriptions thereof).

In some embodiments, the industrial IoT management platform 130 may input one or more first training samples into an initial data allocation model to obtain upload analysis data output from the initial data allocation model. The industrial IoT management platform 130 may substitute the upload analysis data output from the initial data allocation model and the first label(s) corresponding to the one or more first training samples into a predefined equation for a loss function to determine a value of the loss function, and reversely update model parameters in the initial data allocation model based on the value of the loss function. Updating manners of the model parameters may include gradient descent, etc. When an iteration completion condition is satisfied, model training ends, and a trained data allocation model is obtained. The iteration completion condition may include that the value of the loss function is less than a loss threshold, a count of iterations reaching a maximum count of iterations, etc.

In some embodiments, a training phase of the data allocation model may include an initial training phase and a reinforcement training phase. In the initial training phase, a training sample dataset is obtained based on a generic dataset on a cloud platform. In the reinforcement training phase, the training sample dataset is obtained based on a historical dataset of a target enterprise.

The initial training phase refers to a phase in which the initial data allocation model is trained for the first time to obtain the data allocation model.

The generic dataset includes data such as the data to be processed obtained by the industrial IoT system, the data popularity, the data attribute information, the historical retrieval records, and the historical processing records of the data to be processed, the processing capacity of the industrial IoT management platform 130, the data acquisition frequency of the acquisition device, the historical data upload parameters, etc, from different industrial IoT systems of different enterprises.

In some embodiments, the generic dataset is stored in the cloud platform. The cloud platform may be realized based on a cloud server that connects the industrial IoT systems of different enterprises. The industrial IoT systems of different enterprises may upload the above data to the cloud platform regularly or irregularly.

In some embodiments, the industrial IoT management platform 130 may obtain a training dataset for the initial training phase based on the generic dataset according to the aforementioned manner of determining the first training samples and the first labels of the first training samples.

The reinforcement training phase refers to a phase of personalized training for the trained data allocation model in the initial training phase. For example, the reinforcement training phase includes training to enhance the applicability of the data allocation model to the current enterprise.

In some embodiments, the target enterprise may include an enterprise, the type of which is the same or similar to the enterprise type of the current industrial IoT system. The same or similar refers to the same or similar enterprise business scope, enterprise product type, or the like.

The historical dataset refers to a dataset generated when the industrial IoT system of the target enterprise obtains the data to be processed during a historical time period. In some embodiments, the historical dataset includes the data popularity, the data attribute information, the historical retrieval records, and the historical processing records of the data to be processed obtained by the industrial IoT system of the target enterprise, the processing capacity of the industrial IoT management platform 130, the data acquisition frequency of the acquisition device acquiring the data to be processed, and the data upload parameter.

In some embodiments of the present disclosure, the industrial IoT management platform 130 may obtain the training dataset of the reinforcement training phase based on the historical dataset of the target enterprise according to the aforementioned manner of determining the first training samples and the first labels of the first training samples.

In some embodiments, the training sample dataset includes a plurality of sample subsets, where training data in the same sample subset corresponds to the same labels, and the training data in different sample subsets correspond to different learning rates.

The sample subset refers to a set consisting of a portion of the training sample data. For example, the sample subset may include a set consisting of a portion of the first training samples and the first labels corresponding to the portion of the first training samples. In some embodiments, the industrial IoT management platform 130 may designate the first training samples with the same first label as a sample subset.

In some embodiments, in a process of training the data allocation model based on different sample subsets, the industrial IoT management platform 130 may set different learning rates for the different sample subsets. For example, the industrial IoT management platform 130 may set the learning rate of the sample subset with the first label of (0,0,1) as the sample subset with the highest learning rate, and set the learning rate of the sample subset with the first label of (1,0,0) as the sample subset with the lowest learning rate.

It is to be understood that if the data to be processed needs to be uploaded to the processing unit of the industrial IoT management platform 130, it means that the data to be processed needs to be processed more quickly. Therefore, setting the highest learning rate for the sample subset with the first label of (0,0,1) (i.e., the data to be processed to be uploaded to the processing unit of the industrial IoT management platform 130) allows the trained data allocation model to be able to sense the data to be processed that needs to be uploaded to the processing unit as soon as possible.

In some embodiments, by setting different learning rates for different sample subsets, training efficiency of the data allocation model and sense effectiveness of the data allocation model for the different data to be processed can be improved.

In some embodiments, training the data allocation model in the initial training phase based on the training dataset determined by the generic dataset can improve the universality of the data allocation model. Based on the data allocation model trained in the initial training phase, the reinforcement training is performed using the training dataset determined by the historical dataset of the target enterprise, and thus more quickly obtain a data allocation model that is compatible with a current enterprise, improving the pertinence of the model, and improving the accuracy of the upload analysis data output by the model.

In some embodiments, the industrial IoT management platform 130 may designate the data upload parameter with the highest value in the upload analysis data as the data upload parameter of the current data to be processed. Merely by way of example, if the upload analysis data is (0.23, 0.76, 0.37), the value (0.76) corresponding to that the data to be processed is uploaded to the cache database of the industrial IoT management platform 130 is the highest, and the data upload parameter is uploading the data to be processed to the cache database of the industrial IoT management platform 130.

In some embodiments, the industrial IoT management platform 130 may determine data acquisition quality based on device operating status, device health status, and data acquisition bandwidth quality, and determine the data upload parameter based on the data acquisition quality and the upload analysis data.

The device operating status refers to operating status of the data acquisition device. In some embodiments, the device operating status may include voltage data, current data, environmental data (e.g., temperature, humidity, etc.), etc., of the data acquisition device. In some embodiments, the industrial IoT management platform 130 may directly read the voltage data and the current data of the data acquisition device through the industrial IoT perception control platform 150, and obtain the environmental data through temperature sensors, humidity sensors, etc., located in the same environment where the data acquisition device is located to obtain the device operating status.

The device health status is used to characterize the stability of the data acquisition device. In some embodiments, the industrial IoT management platform 130 may obtain fault records, maintenance records, etc., of the data acquisition device, and the lower the fault frequency of the data acquisition device in the fault records is, the more the maintenance records are, and the better the device health status is.

The data acquisition bandwidth quality is used to characterize the quality of uploading the data to be processed obtained by the data acquisition device to the industrial IoT sensing network platform 140. In some embodiments, the industrial IoT management platform 130 may determine the data acquisition bandwidth quality by a packet loss rate and a transmission delay when the industrial IoT sensing network platform 140 receives the data to be processed obtained by the data acquisition device. The lower the packet loss rate and the transmission delay are, the higher the data acquisition bandwidth quality is.

The data acquisition quality characterizes the quality of the data that is obtained and uploaded by the data acquisition device.

In some embodiments, the industrial IoT management platform 130 may construct an acquisition quality vector based on the device operating status, the device health status, and the data acquisition bandwidth quality. The industrial IT management platform 130 may retrieve, in a quality vector database, a reference vector that has the highest similarity to the acquisition quality vector based on the acquisition quality vector, and designate a reference acquisition quality corresponding to the reference vector as the data acquisition quality.

The quality vector database includes a large number of reference vectors constructed based on the historical data and the reference acquisition quality corresponding to the reference vectors. In some embodiments, the industrial IoT management platform 130 may construct the reference vectors based on historical device operating status, historical device health status, and historical data acquisition bandwidth quality corresponding to the data to be processed in the historical data, and mark the reference acquisition quality corresponding to the reference vector according to whether there is data missing or data error in the use of the data to be processed, thereby constructing the quality vector database.

In some embodiments, the industrial IoT management platform 130 may determine a quality threshold based on the value of the recommended degree of the data upload parameter in the upload analysis data of that the data is uploaded to be processed to the processing unit of the industrial IoT management platform 130. The quality threshold positively correlates with the value of the recommended degree of that the data to be processed is uploaded to the processing unit of the industrial IoT management platform 130. The industrial IoT management platform 130 may set the data upload parameter of the data to be processed of which the data acquisition quality is lower than the quality threshold to be that the data to be processed is uploaded to the corresponding sub-database in the industrial IoT sensing network platform 140.

In some embodiments, the data acquisition quality is determined based on the device operating status, the device health status, and the data acquisition bandwidth quality of the data acquisition device, thereby determining the data upload parameter. This approach can avoid uploading the data to be processed with poor data acquisition quality to the industrial IoT management platform 130, which causes the industrial IoT management platform 130 to spend more computing resources on data cleaning, thereby reducing the operating pressure of the industrial IoT management platform 130.

In some embodiments, by determining the upload analysis data through the data allocation model and determining the data upload parameter based on upload analysis parameters in the upload analysis data, a more reasonable data upload parameter can be obtained, so that the data to be processed that needs to be processed by the processing unit on time can be uploaded to the industrial IoT management platform 130 on time, thereby improving efficiency of data flow.

Figure 4:
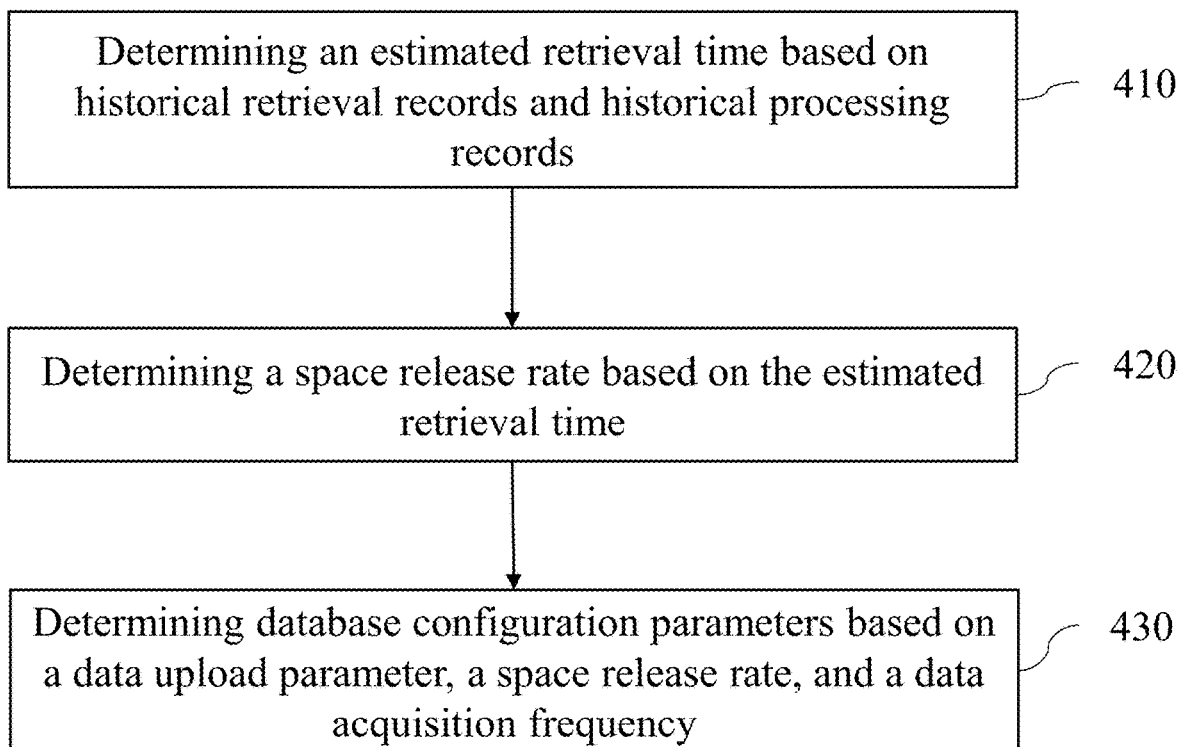
FIG. 4 is a flowchart illustrating an exemplary process of determining database configuration parameters according to some embodiments of the present disclosure.

FIG. 4 is a flowchart illustrating an exemplary process of determining database configuration parameters according to some embodiments of the present disclosure.

In 410, determining an estimated retrieval time based on historical retrieval records and historical processing records.

The estimated retrieval time refers to an estimated time when the data to be processed in the database is retrieved. For example, the estimated retrieval time may be a time point at which the processing unit of the industrial IoT management platform 130 retrieves the data to be processed from the cache database or the sub-database of the industrial IoT sensing network platform 140 during a future time period.

In some embodiments, the industrial IoT management platform 130 may designate an average time length between a time point when the historical data to be processed and the cached data, which have the same or similar data types in the historical retrieval records and the historical processing records, are retrieved or processed and a time point when the historical data to be processed is acquired, as a length of the estimated retrieval time. The industrial IoT management platform 130 may determine the estimated retrieval time based on a time point when the data to be processed is acquired and the length of the estimated retrieval time.

In some embodiments, since the data to be processed may be retrieved a plurality of times, the industrial IoT management platform 130 may determine a first estimated retrieval time of the data to be processed based on a time point when a plurality of pieces of historical data to be processed are first retrieved or processed, and determine a second estimated retrieval time of the current data to be processed based on a time point when the plurality of pieces of historical data to be processed are retrieved or processed for the second time, and so on, thereby obtaining a plurality of estimated retrieval times of the data to be processed.

In 420, determining a space release rate based on the estimated retrieval time.

The space release rate refers to a rate at which old data in the database is cleaned. For example, the space release rate may be a data volume of old data cleaned per unit time during a next preset period. More descriptions regarding the preset period may be found in the related descriptions below (e.g., FIG. 2 and related descriptions thereof).

In some embodiments, the industrial IoT management platform 130 designates the data to be processed whose count of retrieved times will reach the maximum count of times during the next preset period, as the data to be processed that needs to be cleaned during the next preset period. The maximum count of times may be preset by the technician. The industrial IoT management platform 130 determines the data volume to be processed that needs to be cleaned during the next preset period based on the data volume to be processed that needs to be cleaned. The industrial IoT management platform 130 determines the space release rate based on the data volume to be processed that needs to be cleaned during the next preset period and a time length of the next preset period.

In some embodiments, the industrial IoT management platform 130 may also determine a data retrieval threshold based on the data attribute information, a type of a current database, and the processing capacity, and determine the space release rate based on the data retrieval threshold and the estimated retrieval time.

The type of the current database refers to a type of the database where the data to be processed is stored. For example, the type of a current database may be the cache database, the sub-database, etc.

The data retrieval threshold refers to the maximum count of times the data to be processed is retrieved. In some embodiments, when the count of retrieved times of the data to be processed in the database (e.g., the cache database, the sub-database, etc.) reaches the data retrieval threshold, the database may clean the data to be processed.

In some embodiments, the industrial IoT management platform 130 may construct a retrieval feature vector based on the data attribute information, the type of the current database, and the processing capacity. The industrial IoT management platform 130 may retrieve, in a retrieval vector database, a reference retrieval vector with the highest similarity to the retrieval feature vector based on the retrieval feature vector. The industrial IoT management platform 130 may designate a reference retrieval threshold corresponding to the reference retrieval vector as the data retrieval threshold. More descriptions regarding the data attribute information may be found elsewhere in the present disclosure (e.g., FIG. 2 and related descriptions thereof), and more descriptions regarding the processing capacity may be found elsewhere in the present disclosure (e.g., FIG. 3 and related descriptions thereof).

The retrieval vector database includes a large number of reference retrieval vectors and their corresponding reference retrieval thresholds. In some embodiments, the industrial IoT management platform 130 may construct the reference retrieval vector based on the historical data attribute information corresponding to the historical data to be processed, a type of the historical database, and the historical processing capacity, and designate an actual count of retrieved times of the historical data to be processed as the reference retrieval threshold corresponding to the reference retrieval vector, thereby constructing the retrieval vector database.

In some embodiments, the industrial IoT management platform 130 may designate the data to be processed, the count of retrieved times of which reaches the data retrieval threshold during the next preset period, as the data to be processed that needs to be cleaned, and determine the space release rate according to the above manner.

In some embodiments, the data retrieval threshold of the database is determined by the data attribute information, the type of the current database, and the processing capacity, and is used to determine the space release rate, so that a more reasonable space release rate can be obtained.

In 430, determining database configuration parameters based on a data upload parameter, the space release rate, and a data acquisition frequency.

In some embodiments, if the data upload parameter is to upload the data to be processed to the sub-database of the industrial IoT sensing network platform 140, the industrial IoT management platform 130 may determine the data storage rate of the sub-database according to the data acquisition frequency corresponding to all of the data to be processed that is need to be stored in the sub-database. The industrial IoT management platform 130 may determine whether remaining storage space of the sub-database will be less than 0 during the next preset period based on the remaining storage space of the sub-database, the data storage rate, and the space release rate. If the remaining storage space of the sub-database will be no less than 0 during the next preset period, it means that the storage space is sufficient during the next preset period, and there is no need to adjust the sub-database configuration parameters of the sub-database. If the remaining storage space of the sub-database will be less than 0 during the next preset period, it means that the storage space is insufficient during the next preset period, and the total data volume is determined based on a current data volume of the sub-database, the data storage rate, and the space release rate, and a size of the storage space required for the total data volume is used as the sub-database configuration parameters. For example, if there is currently 3 GB of data in the sub-database, the data storage rate during the next preset period is 0.4 GB/hour, the space release rate is 0.2 GB/hour, and the length of the preset period is 24 hours, then the storage space required at an end of the next preset period may be 3 GB+(0.4 GB−0.2 GB)× 24=7.8 GB, and therefore the sub-database is configured as 7.8 GB.

In some embodiments, the database configuration parameters further include cache update parameters, and the industrial IoT management platform 130 may also determine the cache update parameters based on data attribute information, a type of an enterprise user, the historical retrieval records, the historical processing records, the device health status, and the device operating status of cached data in the cache database, and update configuration parameters of the second storage component according to the cache update parameters.

The cache update parameters refer to parameters related to the reconfiguration of the storage space of the cache database. In some embodiments, the cache update parameter may include an update period and an updated volume. The updated volume refers to an adjusted volume of the storage space of the cache database, such as a data volume that is deleted from the cache database or overwritten during the updating period.

The cached data refers to data stored in the cache database. For example, the cached data may be the data to be processed, processing results thereof, etc., stored in the cache database.

The type of the enterprise user refers to a type of the enterprise user in the industrial IoT system, such as a hardware processing enterprise, an electronic component manufacturing enterprise, or the like. In some embodiments, the type of the enterprise user may be set by the user.

In some embodiments, the industrial IoT management platform 130 may input the data attribute information, the type of the enterprise user, the historical retrieval records, the historical processing records, the device health status, and the device operating status into an update parameter determination model to obtain the cache update parameters. The update parameter determination model may be a recurrent neural network (RNN) model. More descriptions regarding the data attribute information, the historical retrieval records, and the historical processing records may be found elsewhere in the present disclosure (e.g., FIG. 2 and related descriptions thereof), and more descriptions regarding the device health status and the device operating status may be found elsewhere in the present disclosure (e.g., FIG. 3 and related descriptions thereof).

In some embodiments, the update parameter determination model may be obtained by training based on a large number of second training samples with second labels. The second training samples may include sample data attribute information, a type of a sample enterprise user, the sample historical retrieval records, the sample historical processing records, a sample device health status, and a sample device operating status of sample data to be processed in a sample cache database. The second label may be an actual cache update parameter corresponding to the sample cache database.

In some embodiments, the industrial IoT management platform 130 may construct a second training sample based on the historical data attribute information, a type of a historical enterprise user, the historical retrieval records, the historical processing record, historical device health status, and historical device operating status corresponding to the cached data in different historical time periods in the historical data. The industrial IoT management platform 130 may designate a validity period of historical cached data of the historical time period corresponding to the second training sample as the update period, and designate a data volume in the cache database when the update period is reached as the update volume, so as to obtain the second label. The validity period refers to a length of time between a time point when the historical cached data is stored in the cache database and a time point when it is deleted. The training process of the update parameter determination model is similar to the training process of the data allocation model in FIG. 2, and more descriptions may be found elsewhere in the present disclosure (e.g., FIG. 2 and related descriptions thereof).

In some embodiments, the cache update parameters are also related to the data acquisition quality, the upload bandwidth quality, and the data storage rate.

The data storage rate refers to a data volume stored in the database per unit time. In some embodiments, the industrial IoT management platform 130 may determine the data storage rate according to the data acquisition frequency of data stored in the cache database and the data volume acquired each time. For example, if the data acquisition device acquires 50 MB of data each time, and the data acquisition frequency is 3 times/hour, the data storage rate may be calculated as 50 MB×3=150 MB/hour.

In some embodiments, the update period in the cache update parameters is positively correlated with the data acquisition quality and the upload bandwidth quality, and negatively correlated with the data storage rate. For example, the industrial IoT management platform 130 may adjust, on the basis of the aforementioned determined cache update parameters, based on the data acquisition quality, the upload bandwidth quality, and the data storage rate, to obtain adjusted cache update parameters. More descriptions regarding the data acquisition quality and the upload bandwidth quality may be found elsewhere in the present disclosure (e.g., FIG. 3 and related descriptions thereof).

It is understood that for cached data with high data acquisition quality and upload bandwidth quality, the industrial IoT management platform 130 may retrieve a plurality of times, so the update period may be extended. For cached data with a high data storage rate, the storage space of the cache database may be filled up more quickly, so the update period may be shortened to avoid data loss caused by an insufficient cache database.

In some embodiments, adjusting the cache update parameters, based on the data acquisition quality, the upload bandwidth quality, and the data storage rate, can combine the actual adjustment requirements of the cache database to retain data of good quality while ensuring that the cache database has sufficient storage space.

In some embodiments, the industrial IoT management platform 130 may transmit the cache update parameters to the second storage component to cause the second storage controller of the second storage component to update the storage space of the cache database according to the cache update parameters. More descriptions regarding the second storage component may be found elsewhere in the present disclosure (e.g., FIG. 2, step 240, and related descriptions thereof).

In some embodiments, the cache update parameters are determined by the data attribute information, the type of the enterprise user, the historical retrieval records, the historical processing records, the device health status, and the device operating status corresponding to the cached data, so that more reasonable cache update parameters can be obtained. In some embodiments, the estimated retrieval time of the data to be processed is determined based on historical data retrieval records and historical data processing records, and the space release rate is further determined to obtain data configuration parameters. The storage space of the database can be flexibly adjusted according to the storage, retrieval, and deletion of the data to ensure the normal operation of different databases and avoid data loss.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be noted that in order to simplify the presentation of the disclosure, and thereby aid in the understanding of one or more embodiments of the invention, the foregoing descriptions of embodiments of this disclosure sometimes group multiple features together in a single embodiment, accompanying drawings, or in a description thereof. However, this method of disclosure does not imply that the objects of the present disclosure require more features than those mentioned in the claims. Rather, claimed subject matter may lie in less than all features of a single foregoing disclosed embodiment.

Some embodiments use numbers describing the number of components, attributes, and it is to be understood that such numbers used in the description of embodiments are modified in some examples by the modifiers "about", "approximately", or "substantially". Unless otherwise stated, "about," "approximately," or "substantially" indicates that the number is allowed to vary by +20%. Correspondingly, in some embodiments, the numerical parameters used in the disclosure and claims are approximations, which can change depending on the desired characteristics of individual embodiments. In some embodiments, the numerical parameters should take into account the specified number of significant digits and employ general place-keeping. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Correspondingly, the embodiments of the present disclosure are not limited to the embodiments introduced and described in the present disclosure explicitly.

What is claimed is:

1. A system for storage configuration based on an industrial internet of things (IoT) data center, comprising: an industrial IoT management platform, an industrial IoT sensing network platform, and an industrial IoT perception control platform, wherein the industrial IoT management platform is communicatively connected to the industrial IoT perception control platform via the industrial IoT sensing network platform;

the industrial IoT management platform is configured to:
determine a data upload parameter based on data attribute information, historical retrieval records, and historical processing records of data to be processed, including:
determining upload analysis data via a data allocation model, based on data popularity, the data attribute information, the historical retrieval records, the historical processing records, processing capacity of the industrial IoT management platform, and a data acquisition frequency, wherein the data allocation model is a neural network model; and
determining the data upload parameter based on the upload analysis data, including:
determining data acquisition quality based on device operating status, device health status, and data acquisition bandwidth quality; and
determining the data upload parameter based on the data acquisition quality and the upload analysis data;
generate database configuration parameters based on the data upload parameter and a data acquisition frequency, wherein the database configuration parameters further include cache update parameters for a cache database, and the cache update parameters include an update period and an updated volume, including:
determining an estimated retrieval time based on the historical retrieval records and the historical processing records;
determining a space release rate based on the estimated retrieval time, including:
determining a data retrieval threshold based on the data attribute information, a type of a current database, and the processing capacity;
designating data to be processed whose count of retrieved times reaching the data retrieval threshold during a next preset period as data to be processed that needs to be cleaned, and determining the space release rate based on the data retrieval threshold and the estimated retrieval time;
determining the database configuration parameters based on the data upload parameter, the space release rate, and the data acquisition frequency;
determining the cache update parameters via an update parameter determination model based on data attribute information of cached data in the cache database, a type of an enterprise user, the historical retrieval records, the historical processing records, the device health status, and the device operating status, wherein the update parameter determination model is a recurrent neural network model, wherein:
the update period in the cache update parameters is positively correlated with the data acquisition quality and the data acquisition bandwidth quality, and negatively correlated with a data storage rate; and updating configuration parameters of a second storage component according to the cache update parameters;

in response to determining that future remaining space is less than a preset space threshold, reallocate a size of storage space of a database, so that the future remaining space exceeds the preset space threshold;

query an acquisition frequency table based on the database configuration parameters of a previous period to update the data acquisition frequency for a current period;

generate, based on the data upload parameter, a data upload instruction, and transmit the data upload instruction to the industrial IoT sensing network platform;

generate operating parameters of a second storage component based on cache database configuration parameters;

control a second storage controller to allocate storage space to a cache database based on the operating parameters of the second storage component; and generate, based on sub-database configuration parameters, a sub-database configuration instruction, and issue the sub-database configuration instruction to the industrial IoT sensing network platform;

obtain, from a first storage controller, total storage space allocated or released by a sub-database to a task process within a preset time period, and designate a sub-database whose total storage space allocated or released exceeds a preset threshold as a target sub-database; and modify configuration files and structured query language (SQL) of the target sub-database to adjust a maximum count of connections allowed by the target sub-database.

2. The system according to claim 1, wherein the industrial IoT management platform is further configured to:

during each preset period, update, based on the database configuration parameters of the previous period, the data acquisition frequency for the current period to obtain an updated frequency; and control a data acquisition device via the industrial IoT perception control platform to perform data acquisition according to the updated frequency, wherein the data acquisition device includes at least one of a production device or an auxiliary device deployed on a production line.

3. The system according to claim 1, wherein a training phase of the data allocation model includes an initial training phase and a reinforcement training phase;

during the initial training phase, a training sample dataset is obtained based on a generic dataset on a cloud platform; and during the reinforcement training phase, the training sample dataset is obtained based on a historical dataset of a target enterprise.

4. The system according to claim 3, wherein the training sample dataset includes a plurality of sample subsets, training data within a same sample subset share a same label, and training data across different sample subsets are assigned distinct learning rates.

5. The system according to claim 1, wherein the industrial IoT management platform is further configured to:

determine a timeliness requirement degree of the data to be processed based on a length of waiting processing time and a retrieved index;

in response to the timeliness requirement degree being greater than a first threshold, upload the data to be processed to a processing unit of the industrial IoT management platform;

in response to the timeliness requirement degree being greater than a second threshold and less than the first threshold, upload the data to be processed to the cache database of the industrial IoT management platform; and in response to the timeliness requirement degree being less than the second threshold, upload the data to be processed to the sub-database of the industrial IoT sensing network platform;

wherein the length of waiting processing time is a length of time from a time that the data to be processed is uploaded to the sub-database to a time that the industrial IoT management platform begins to process the data to be processed, the retrieved index is used to characterize a frequency at which the data to be processed is retrieved, the timeliness requirement degree characterizes a timeliness of the data to be processed, the timeliness requirement degree is positively correlated with the retrieved index and negatively correlated with the length of waiting processing time, and the first threshold is greater than the second threshold.

6. The system according to claim 1, wherein the preset period refers to a period for updating the database configuration parameters, and the preset period is negatively correlated to the acquisition frequency of the data to be processed.

7. The system according to claim 1, wherein the upload analysis data is represented as a vector including a first value, a second value, and a third value, the first value, the second value, and the third value representing a recommendation degree for uploading the data to be processed to the sub-database, the cache database, and a processing unit, respectively.

8. The system according to claim 1, wherein the industrial IoT management platform is further configured to:

construct an acquisition quality vector based on the device operating status, the device health status, and the data acquisition bandwidth quality;

retrieve, from a quality vector database, a reference vector that has a highest similarity to the acquisition quality vector; and designate a reference acquisition quality corresponding to the reference vector as the data acquisition quality.

9. A method for storage configuration based on an industrial internet of things (IoT) data center, wherein the method is performed by an industrial IoT management platform of a system for storage configuration based on an industrial IoT data center, the system includes the industrial IoT management platform, an industrial IoT sensing network platform, and an industrial IoT perception control platform, wherein the industrial IoT management platform is communicatively connected to the industrial IoT perception control platform via the industrial IoT sensing network platform;

the method comprising:

determining a data upload parameter based on data attribute information, historical retrieval records, and historical processing records of data to be processed, including:

determining upload analysis data via a data allocation model, based on data popularity, the data attribute information, the historical retrieval records, the historical processing records, processing capacity of the industrial IoT management platform, and a data acquisition frequency, wherein the data allocation model is a neural network model; and determining the data upload parameter based on the upload analysis data, including:

determining data acquisition quality based on device operating status, device health status, and data acquisition bandwidth quality; and determining the data upload parameter based on the data acquisition quality and the upload analysis data;

generating database configuration parameters based on the data upload parameter and a data acquisition frequency, wherein the database configuration parameters further include cache update parameters for a cache database, and the cache update parameters include an update period and an updated volume, including:

determining an estimated retrieval time based on the historical retrieval records and the historical processing records;

determining a space release rate based on the estimated retrieval time, including:

determining a data retrieval threshold based on the data attribute information, a type of a current database, and the processing capacity;

designating data to be processed whose count of retrieved times reaching the data retrieval threshold during a next preset period as data to be processed that needs to be cleaned, and determining the space release rate based on the data retrieval threshold and the estimated retrieval time;

determining the database configuration parameters based on the data upload parameter, the space release rate, and the data acquisition frequency;

determining the cache update parameters via an update parameter determination model based on data attribute information of cached data in the cache database, a type of an enterprise user, the historical retrieval records, the historical processing records, the device health status, and the device operating status, wherein the update parameter determination model is a recurrent neural network model, wherein:

the update period in the cache update parameters is positively correlated with the data acquisition quality and the data acquisition bandwidth quality, and negatively correlated with a data storage rate;

updating configuration parameters of a second storage component according to the cache update parameters; and in response to determining that future remaining space is less than a preset space threshold, reallocating a size of storage space of a database, so that the future remaining space exceeds the preset space threshold;

querying an acquisition frequency table based on the database configuration parameters of a previous period to update the data acquisition frequency for a current period;

generating, based on the data upload parameter, a data upload instruction, and transmitting the data upload instruction to the industrial IoT sensing network platform;

generating operating parameters of a second storage component based on cache database configuration parameters;

controlling a second storage controller to allocate storage space to a cache database based on the operating parameters of the second storage component; and generating, based on sub-database configuration parameters, a sub-database configuration instruction, and issuing the sub-database configuration instruction to the industrial IoT sensing network platform;

obtaining, from a first storage controller, total storage space allocated or released by a sub-database to a task process within a preset time period, and designating a sub-database whose total storage space allocated or released exceeds a preset threshold as a target sub-database; and modifying configuration files and structured query language (SQL) of the target sub-database to adjust a maximum count of connections allowed by the target sub-database.

10. The method according to claim 9, wherein the method further comprises:

during each preset period, updating, based on the database configuration parameters of the previous period, the data acquisition frequency for the current period to obtain an updated frequency; and controlling a data acquisition device via the industrial IoT perception control platform to perform data acquisition according to the updated frequency, wherein the data acquisition device includes at least one of a production device or auxiliary device deployed on a production line.

11. The method according to claim 9, wherein a training phase of the data allocation model includes an initial training phase and a reinforcement training phase;

during the initial training phase, a training sample dataset is obtained based on a generic dataset on a cloud platform; and during the reinforcement training phase, the training sample dataset is obtained based on a historical dataset of a target enterprise.

12. The method according to claim 11, wherein the training sample dataset includes a plurality of sample subsets, training data within a same sample subset share a same label, and training data across different sample subsets are assigned distinct learning rates.

13. The method according to claim 9, wherein the method further comprises:

determining a timeliness requirement degree of the data to be processed based on a length of waiting processing time and a retrieved index;

in response to the timeliness requirement degree being greater than a first threshold, uploading the data to be processed to a processing unit of the industrial IoT management platform;

in response to the timeliness requirement degree being greater than a second threshold and less than the first threshold, uploading the data to be processed to the cache database of the industrial IoT management platform; and in response to the timeliness requirement degree being less than the second threshold, uploading the data to be processed to the sub-database of the industrial IoT sensing network platform;

wherein the length of waiting processing time is a length of time from a time that the data to be processed is uploaded to the sub-database to a time that the industrial IoT management platform begins to process the data to be processed, the retrieved index is used to characterize a frequency at which the data to be processed is retrieved, the timeliness requirement degree characterizes a timeliness of the data to be processed, the timeliness requirement degree is positively correlated with the retrieved index and negatively correlated with the length of waiting processing time, and the first threshold is greater than the second threshold.

14. The method according to claim 9, wherein:

the preset period refers to a period for updating the database configuration parameters, and the preset period is negatively correlated to an acquisition frequency of the data to be processed.

15. The method according to claim 9, wherein the upload analysis data is represented as a vector including a first value, a second value, and a third value, and the first value, the second value, and the third value representing a recommendation degree for uploading the data to be processed to the sub-database, the cache database, and a processing unit, respectively.

16. The method according to claim 9, wherein determining the data acquisition quality includes:

constructing an acquisition quality vector based on the device operating status, the device health status, and the data acquisition bandwidth quality;

retrieving, from a quality vector database, a reference vector that has a highest similarity to the acquisition quality vector; and designating a reference acquisition quality corresponding to the reference vector as the data acquisition quality.

\* \* \* \* \*